United States Patent

Matt et al.

[11] Patent Number: 5,771,474
[45] Date of Patent: Jun. 23, 1998

[54] METHOD FOR TESTING ELECTRONIC CONTROL DEVICES

[75] Inventors: Peter Matt, Moessingen; Roland Schmid, Dettingen; Gerold Walter, Reutlingen, all of Germany; Mark-John Jordan, Fife, Great Britain

[73] Assignee: RobertBosch GmbH, Stuttgart, Germany

[21] Appl. No.: 522,301

[22] PCT Filed: Dec. 16, 1994

[86] PCT No.: PCT/DE94/01516

§ 371 Date: Oct. 3, 1995

§ 102(e) Date: Oct. 3, 1995

[87] PCT Pub. No.: WO95/18976

PCT Pub. Date: Jul. 13, 1995

[30] Foreign Application Priority Data

Jan. 4, 1994 [DE] Germany ............................ 44 00 079.0

[51] Int. Cl.$^6$ ....................................................... G06F 7/70
[52] U.S. Cl. ................................. 701/29; 701/33; 701/35; 701/31; 73/117.3; 324/73.1; 340/439
[58] Field of Search ........................ 364/424.04, 423.098, 364/424.034, 424.035, 424.036, 424.037, 424.038, 424.039, 431.04, 431.11, 431.12, 550, 551.01, 151; 371/20.1, 22.3, 25.1; 395/183.06, 183.16, 183.01, 183.07; 73/117.2, 117.3, 116, 118.1; 340/438, 439; 324/73.1

[56] References Cited

U.S. PATENT DOCUMENTS

| | | | |
|---|---|---|---|
| 4,267,569 | 5/1981 | Baumann et al. | 364/424.04 |
| 4,271,402 | 6/1981 | Kastura et al. | 364/424.04 |
| 4,404,639 | 9/1983 | McGuire et al. | 364/431.11 |
| 4,748,843 | 6/1988 | Schafer et al. | 73/117.3 |
| 4,839,812 | 6/1989 | Nusser et al. | 364/424.04 |
| 4,845,667 | 7/1989 | Hoptner et al. | 364/431.04 |
| 4,908,792 | 3/1990 | Przybyla et al. | 364/431.04 |
| 5,003,479 | 3/1991 | Kobayashi et al. | 364/431.01 |
| 5,056,023 | 10/1991 | Abe | 701/32 |
| 5,077,671 | 12/1991 | Leslie et al. | 701/3 |
| 5,107,428 | 4/1992 | Bethencourt et al. | 364/424.04 |
| 5,150,609 | 9/1992 | Ebner et al. | 73/117.3 |
| 5,214,582 | 5/1993 | Gray | 364/431.11 |
| 5,247,446 | 9/1993 | Motz et al. | 364/431.04 |
| 5,436,837 | 7/1995 | Gerstung et al. | 364/424.034 |
| 5,490,065 | 2/1996 | Hoenninger et al. | 364/431.04 |
| 5,541,504 | 7/1996 | Kubo et al. | 364/424.04 |

Primary Examiner—Jacques H. Louis-Jacques
Attorney, Agent, or Firm—Michael J. Striker

[57] ABSTRACT

The method for testing an electronic control device containing a microcomputer and a volatile memory for programs processed in the microcomputer includes transferring a program module for testing to the microcomputer (14) via a serial interface (SSO) prior to the testing, the program module including commands for executing individual data reading and writing operations in the control device (12) in response to respective test commands; writing the program module into the volatile memory (Code RAM) in the control device (12) prior to the testing; receiving test instructions including several test commands in the microcomputer (14) from an external test device (10) via the serial interface (SSO); processing the program module by the microcomputer (14) to test the control device (12); triggering a number of the individual data reading and writing operations in the control device (12) via the several test commands received in the control device (12); transferring data generated in the control device (12) during the processing of the program module and the triggering to the external test device and evaluating and/or displaying the data received in the external test device with the external test device.

10 Claims, 4 Drawing Sheets

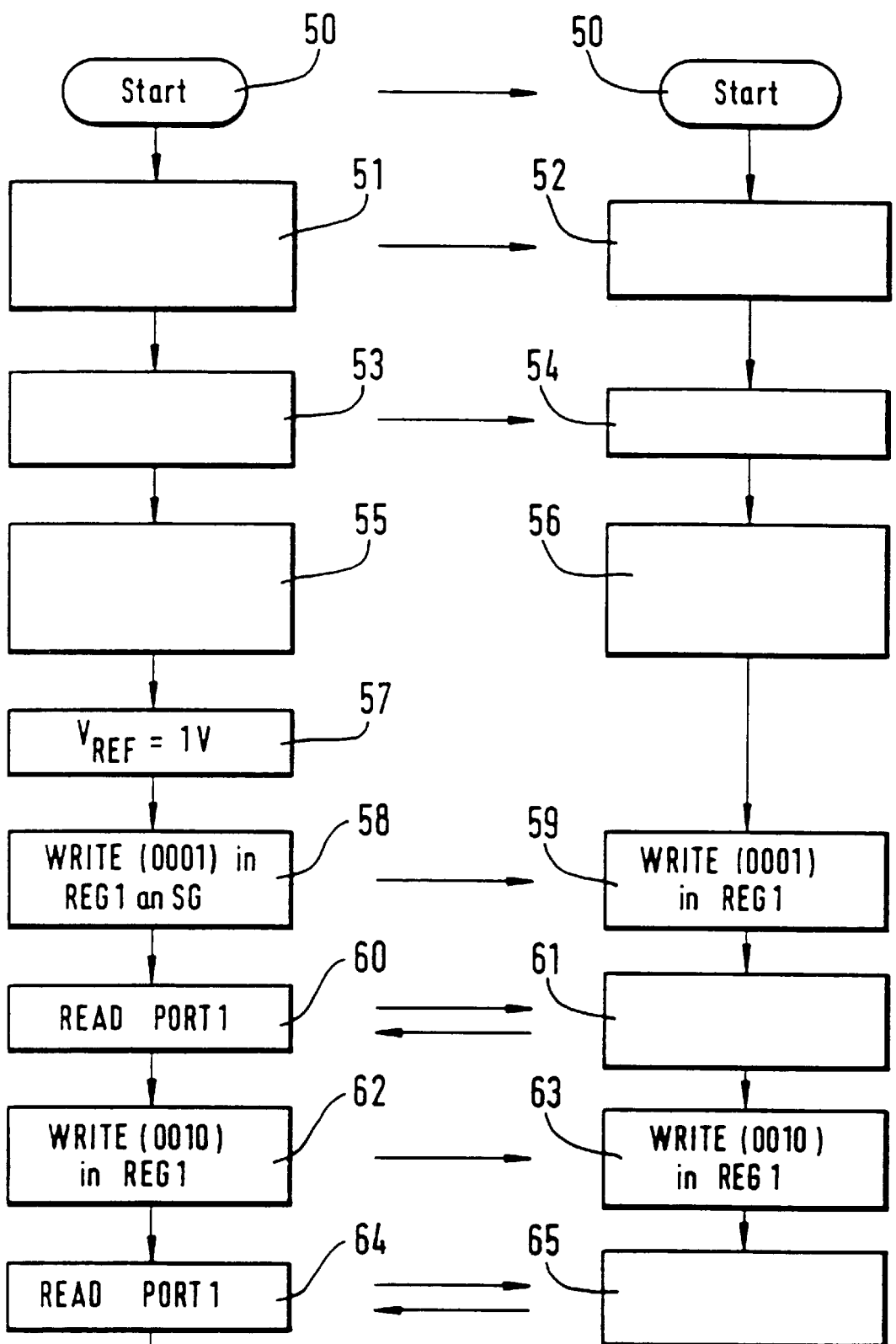

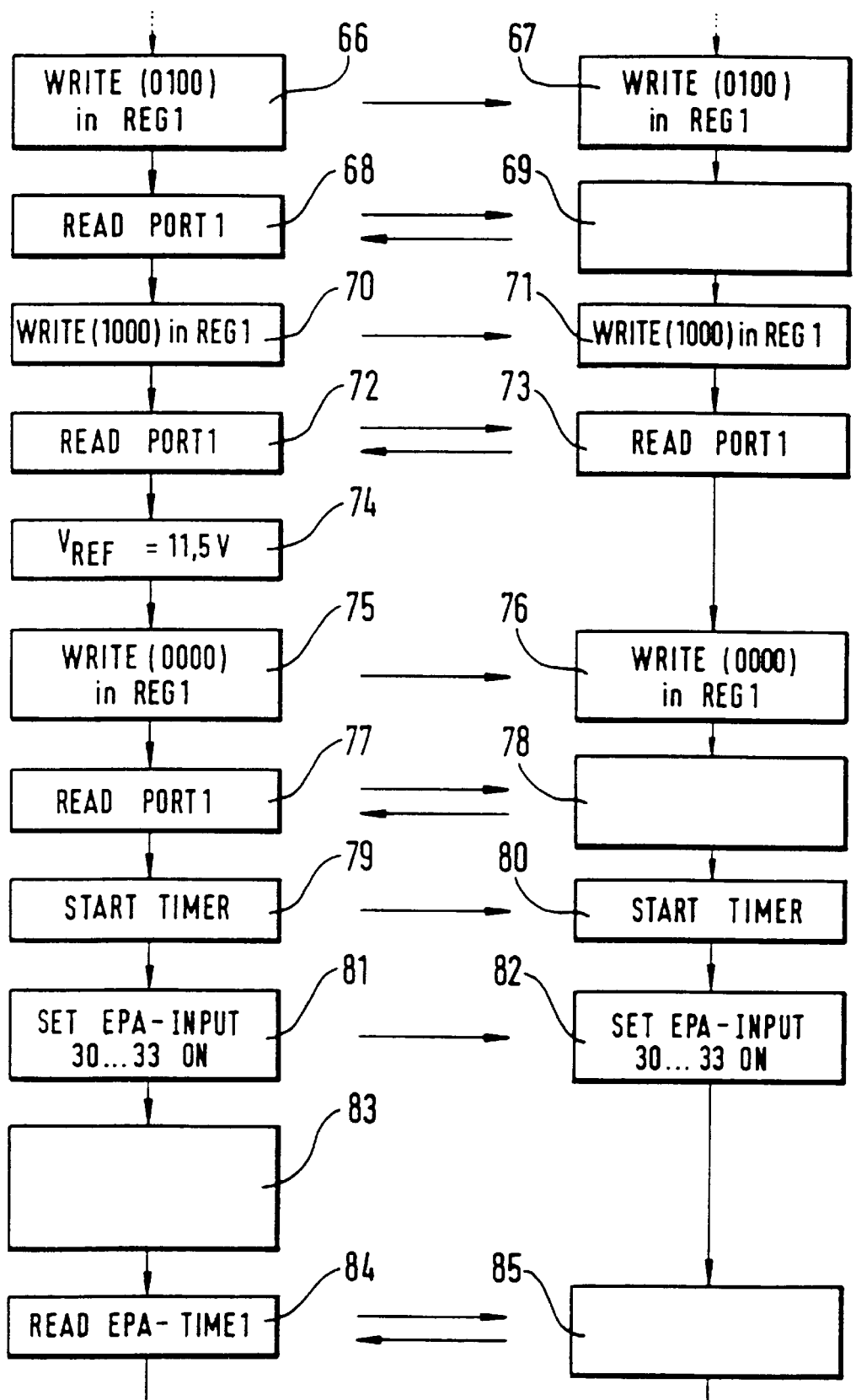

METHOD FOR TESTING ELECTRONIC CONTROL DEVICES

BACKGROUND OF THE INVENTION

The present invention relates to a method of testing electronic control devices containing a microcomputer and a volatile memory for programs processed in the microcomputer, which receives test instructions from an external test device, and, more particularly, to methods for testing motor vehicle control devices.

A method for testing electronic control devices has already been disclosed by DE 39 35 144 C2. In this case, a plurality of electronic control devices are installed in a motor vehicle. The electronic control devices are connected for testing to an external diagnosis unit via a communication bus. In this case, different data transmission protocols, such as asynchronous, serial data transmission and synchronous, serial data transmission, are realized in the various electronic control devices for communication with the external diagnosis unit. The individual electronic control devices have appropriately adapted transmitting and receiving circuits for this purpose.

So that the external diagnosis unit can communicate with the individual control devices, the unit has various communication circuits. A specific communication circuit is selected via the keyboard of the external diagnosis unit for the purpose of testing the electronic control devices. Request signals are then transmitted to the electronic control units via the appropriately selected communication circuit. Those electronic control devices which correctly receive the request signals in accordance with their data transmission protocol then transmit specific data back to the external diagnosis unit. This is then followed by the checking of these electronic control devices in a specific sequence. For this purpose, specific test instructions are transmitted via the external diagnosis unit to an electronic control unit. The instructions are received in the electronic control unit and lead to the output of specific diagnostic data by the respective electronic control device. The received data are displayed on a display of the external diagnosis unit.

SUMMARY OF THE INVENTION

According to the invention, method for testing an electronic control device containing a microcomputer and a volatile memory for programs processed in the microcomputer includes transferring a program module for testing to the microcomputer via a serial interface prior to the testing, the program module including instructions for executing individual data reading and writing operations in the control device in response to respective test commands; writing the program module into the volatile memory in the control device prior to the testing; receiving test instructions including several of the test commands in the microcomputer from an external test device via the serial interface; processing the program module by the microcomputer to test the control device; triggering a number of the individual data reading and writing operations in the control device via the several test commands received in the control device; transferring data generated in the control device during the processing of the control module and by the triggering to the external test device and evaluating and/or displaying the data received in the external test device with the external test device.

By contrast, the method according to the invention has the advantage that the program module for testing is designed such that it can execute data writing operations and/or data reading operations in the electronic control device, and that the individual data writing operations and/or data reading operations are in each case triggered by a test instruction which is transmitted from the external test device to the control device. Testing is thereby very flexible. With the aid of the program module for testing, the external test device can specifically access the CPU register and/or memory locations of the test specimen. The sequence of the testing steps resides solely in the hand of the external test device. It is not, as in the case of conventional diagnosis programs, essentially firmly prescribed. The program module can be used for all control devices which have the same microcomputer.

It is advantageous, furthermore, that during the production of the control device a functional test of the control device is very easily possible on the production line, which functional test is independent of diagnosis modules possibly additionally stored in an EPROM which are provided later for the normal operation of the electronic control device. In particular, the testing time can be reduced thereby, since it is unnecessary to wait for possibly prescribed filter times in the diagnosis. It is likewise advantageous that the same external test device can be used for many different type of control device. All that is then required is to develop respectively adapted program modules for testing the various electronic control devices, which can then be transmitted via the same external test device to the electronic control devices. A further advantage is that the memory part, which is designed as a volatile memory into which programs which can be executed by the microcomputer, can be designed to be small, with the result that the production costs for the control device are reduced. It follows as an additional advantage from this that the transmission period for transmitting the program module for testing can be very short in this case, since the program module requires only a small memory space overall.

Advantageous developments and improvements of the method defined by the main claim are possible by means of the measures set forth in the dependent claims.

It is particularly advantageous that registers of the microcomputer which are specified by the data writing operations are set in a defined fashion in the control device such that specific output signals are generated at specific outputs of the control device. As a result, it is possible to generate in a simple way an output signal which can be detected from outside with the aid of appropriate measuring devices.

It is likewise advantageous that during a data reading operation the contents of specific registers and/or memory locations are read by the microcomputer in the electronic control device and transmitted to the external test device. The input circuits of the electronic control device are so simple to test because, to be precise, the signals present at specific inputs of the control device are converted by the control device into a binary number which is then stored in a register or at a specific memory location of the control device.

It is advantageous, furthermore, that a program module for a serial data transmission protocol is integrated into the program module for testing with the result that after the start of the program module for testing the data transmission can take place between the external test device and electronic control device in accordance with the serial data transmission protocol of the program module for testing. This has the advantage that the data communication between the electronic control device and external test device can take place independently of customer-specific data transmission protocols which may already be laid down in the electronic control device.

It is advantageous, furthermore, that use is made, as the serial data transmission protocol for the program module for testing, of a protocol for synchronous communication between the external test device and electronic control device. The data transmission can thereby take place very quickly and reliably. Thus, for example, a data transmission rate of 800 kBaud can easily be realized. The testing time is then also further reduced by this serial data transmission protocol.

It is advantageous, furthermore, that the electronic control device for testing is provided with an external circuit by means of which the specific outputs of the control device are fed back to specific inputs of the control device. It is possible as a result, in particular, to keep the cost of the external test device low, because in this way measuring devices which detect the output signals of the control device during the test can be eliminated.

It is likewise advantageous that there is connected between the test computer and electronic control device an interface circuit which can be controlled by the test computer and via which signals can be output to specific inputs of the control device. It is possible thereby for special signals for testing, such as specific periodic signals, for example, to be applied simply to the inputs of the control device. The interface circuit can then be connected to the external test device via a plug-in card, with the result that the external test device can be designed, for example, as a simple personal computer. Consequently, the costs for the external test device are further reduced.

BRIEF DESCRIPTION OF THE DRAWING

An exemplary embodiment of the invention is represented in the drawing and explained in more detail in the following description.

FIGS. 2A to 2C shows a flow diagram for the test sequence for the external test device and a flow diagram for the test sequence for the electronic control device.

DESCRIPTION OF THE PREFERRED EMBODIMENTS

The invention relates to a method for testing electronic control devices. Such electronic control devices are used, for example, in a motor vehicle. This is taken to mean engine control devices, brake control devices, gear control devices, air conditioning control devices, power control devices etc. Tests of electronic control devices take place for various purposes. Thus, the control devices have to be checked for operability as early as during their production. However, further tests also take place later, specifically when the control device is installed in a motor vehicle. In this case, as well, the operability of the control device is checked. This generally takes place in the repair shop.

The exemplary embodiment describes the case in which testing of the electronic control device takes place during the manufacture of the control device. Although at this stage assembly of the electronic control device is largely finished, the housing of the electronic control device is not yet sealed, with the result that specific circuit components of the control device are still easily accessible. However, this does not play a decisive role for the test sequence, with the result that testing of the electronic control device can also take place with the housing sealed.

Figure 1:
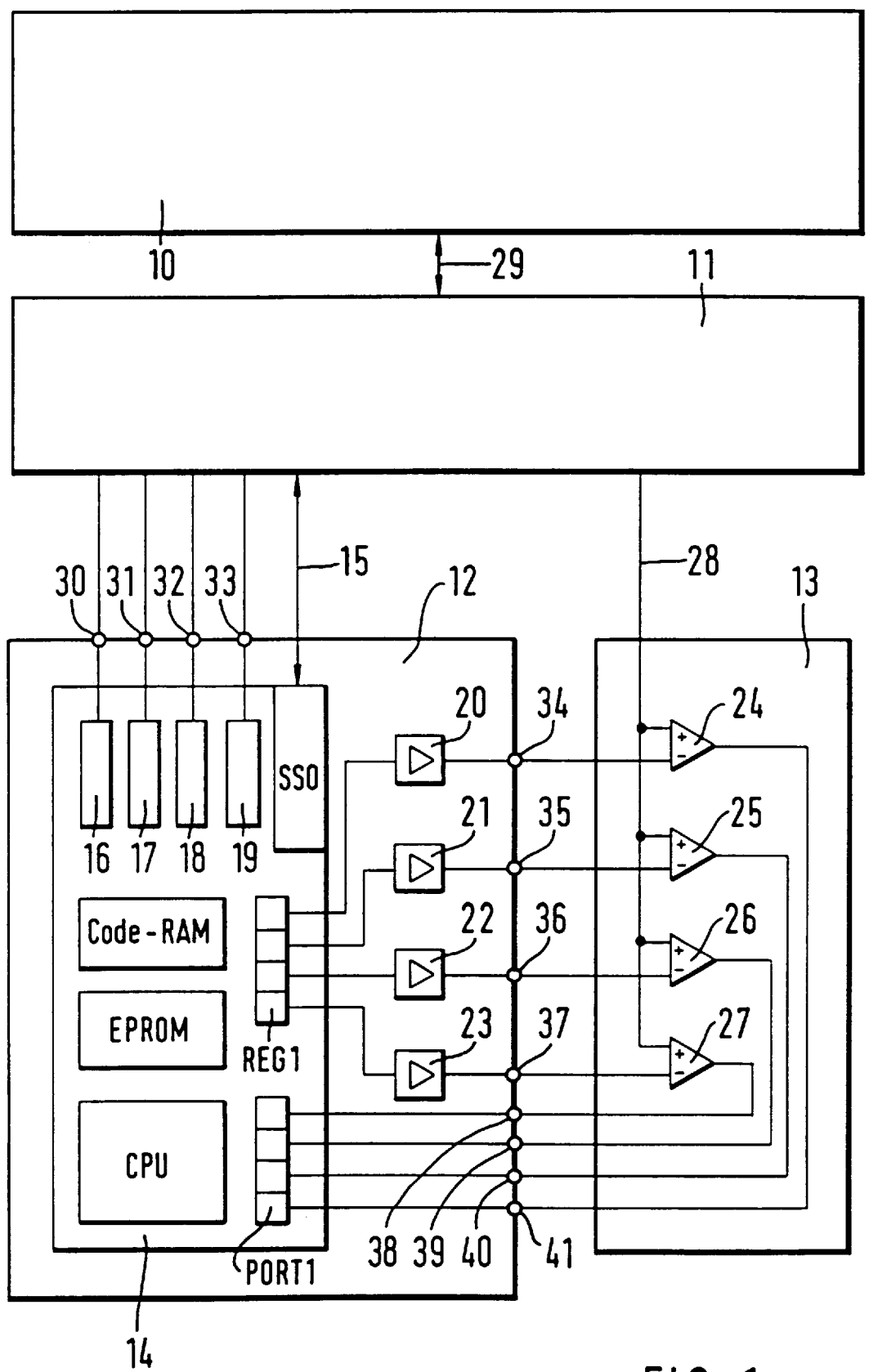
FIG. 1 is a block diagram of a device for the test method according to the invention.

A brake control device is regarded in the exemplary embodiment as an electronic control device. In FIG. 1, the reference numeral 12 designates the brake control device. The brake control device 12 contains a microcomputer as central module. Furthermore, four driver stages 20 to 23 are represented as concrete components of the electronic control device. Further components of the electronic control device, such as all-or-nothing relays, signal processing stages for specific input signals of the control device, etc. are not further represented in detail, for the sake of simplicity. The microcomputer 14 contains a CPU, and EPROM, a code RAM, a serial interface SSO, four special registers 16 to 19, an output register REG1 and an input register PORT1. Of course, still further registers are contained in the microcomputer 14 but, for the sake of clarity these have not been further represented. A special feature of the code RAM is that the instruction counter of the CPU can address the memory locations of the code RAM, so that a program which is stored in the code RAM can be executed by the CPU. It is frequently the case that a volatile memory (RAM) which does not, however, have the mentioned special feature is used in an electronic control device. In such a case, all that can be entered in the volatile memory (RAM) are data to which the control program, which is then located in the EPROM, can make recourse for the purpose of calculating the controlled variables. In particular, intermediate results of calculations are entered into such a memory (RAM).

The special registers 16 to 19 are part of an input/output circuit which is also denoted as an event processor array (EPA). This input/output circuit renders it possible to count events such as, for example, the occurrence of a falling or rising edge and the time measurement between two events. Arbitrary digital signals can thus therefore be detected and evaluated. In a further type of operation, the input/output circuit can also be used to generate arbitrary digital signals which are transmitted via an output of the microcomputer. However, this case of operation is not utilized in the exemplary embodiment described here. The special registers 16 to 19 are therefore connected to inputs 30 to 33 of the control device 12. When the brake control device 12 is installed in the motor vehicle, wheel speed sensors are connected to these inputs 30 to 33. Each register position of the output register REG1 is connected to one of the driver stages 20 to 23 of the control device. The outputs of the driver stages 20 to 23 are connected to outputs 34 to 37 of the control device 12. The driver stages 20 to 23 are used in normal operation of the brake control device 12 to drive solenoid valves which then vary the pressure in the brake lines of the motor vehicle in accordance with the control signals transmitted. The register positions of the input register PORT1 are connected to the inputs 38 to 41 of the control device 12. In the normal operating case of the control device 12, it is possible, for example, to connect a braking contact switch, an idling contact switch etc. to these inputs. However, they can also be unused in the normal operating case of the control device 12.

An interface circuit 11 is, furthermore, connected to the inputs 30 to 33 of the control device 12. The interface circuit 11 is also connected via a serial transmission line 15 to the inputs of the serial interface SSO of the microcomputer 14. The interface circuit 11 is connected, furthermore, to an external test device 10. The connection between the interface circuit 11 and external test device 10 is produced via a serial transmission line 29. The external test device can in this case be a commercially available personal computer. The interface circuit 11 likewise has a microcomputer and storage means as well as additional circuits with the aid of which the voltage supply for the connected control device 12 is controlled, or else special signals are generated for the inputs 30 to 33 of the electronic control device 12. The structure of the interface circuit 11 is, however, not represented in more detail, since this is known per se to a test and measurement engineer.

A further external circuit 13 is connected for testing purposes to the control device 12. Comparators 24 to 27 are contained in the external circuit 30. The inverting inputs of the comparators 24 to 27 are connected to the outputs 34 to 37 of the control device 12. The non-inverting inputs of the comparators 24 to 27 are all connected to a line 28 which is led up to the interface circuit 11. The outputs of the comparators 24 to 27 are led via the circuit 13 to the inputs 38 to 41 of the control device 12. It is therefore possible when testing the control device 12 to transmit from the microcomputer 14 to the driver stages 20 to 23 signals which are compared by the comparators 24 to 27 with a reference voltage, and the results of comparison are fed back to inputs of the control device 12, with the result that the microcomputer 14 of the control device 12 can extract the results of the comparison from the input register PORT1.

Figures 2A, 2B:
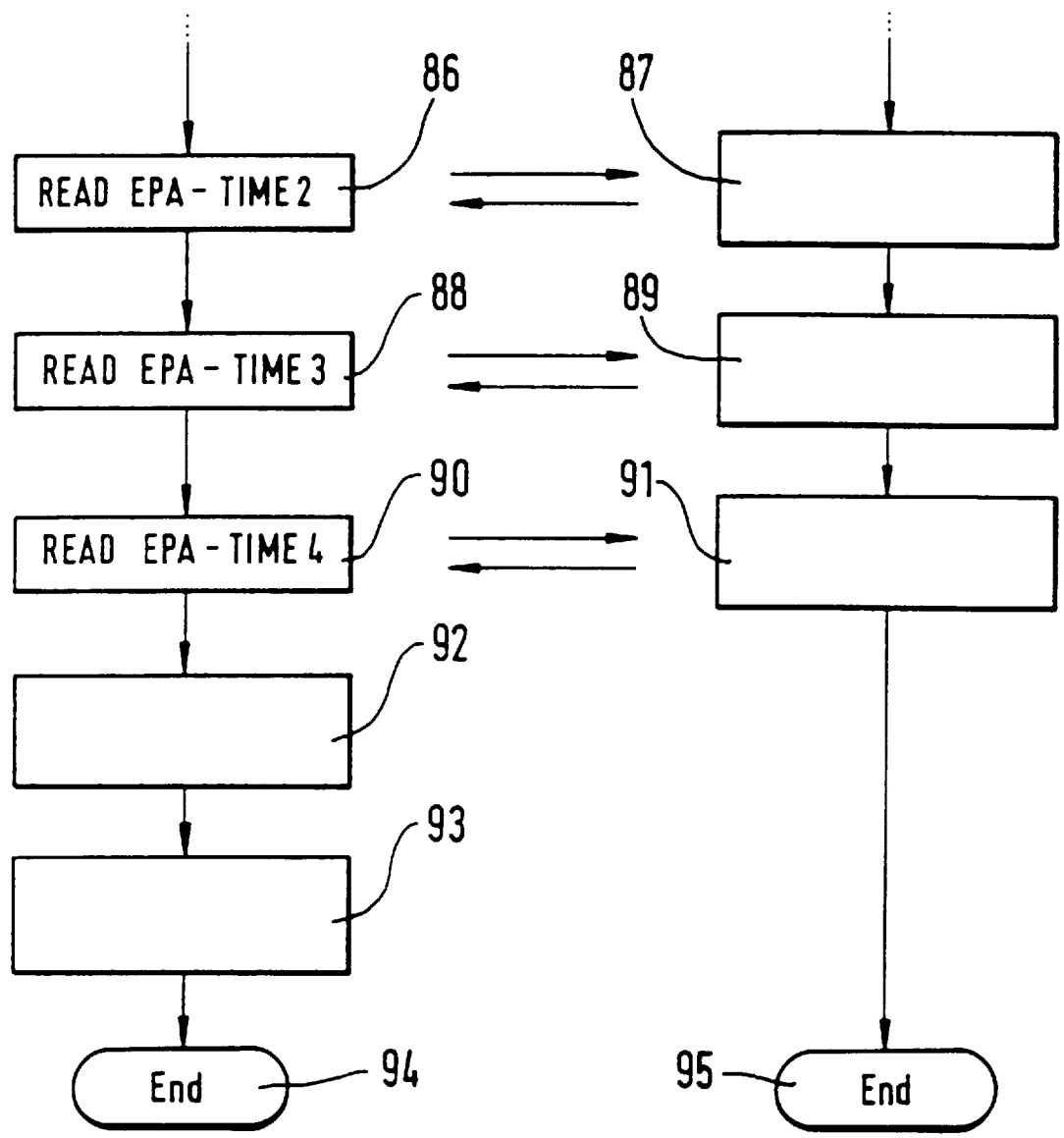

The test sequence is explained in more detail below with the aid of the flow diagrams in FIG. 2A to 2C. After the interface circuit 11 and the external circuit 13 have been connected to the corresponding inputs and outputs of the control device 12, the external test device 10 transmits a start instruction 50 to the control device 12 and the interface circuit 11. This instruction and the further instructions, as well, are transmitted via the serial transmission line 15 to the serial interface SSO of the microcomputer 14. After the microcomputer 14 has recognized the start instruction, it branches, for its part, to a communication program which is contained either in the EPROM or in an additionally separately available test ROM of the microcomputer 14. The microcomputer 14 is capable with the aid of this communication program of receiving and also of transmitting specific data via the serial interface SSO. After the test has been initiated, the external test device 10 then transfers a program module for testing to the control device 12 in step 51. The communication over the serial transmission line 15 takes place in this case after the communication program of the microcomputer 14, a standard transmission rate of, for example, 9.6 kBaud being used. The microcomputer 14 of the control device 12 transmits the data, received via the serial interface SSO, into the code RAM. This is performed in program step 52 of the microcomputer 14. In program step 53, the external test device transmits a start instruction for starting the transferred program module to the microcomputer 14. After the reception of this start instruction, the microcomputer 14 then starts processing the program module, which is now stored in the code RAM of the microcomputer 14. This is performed in program step 54. The external test device 10 then executes an initialization during which the serial interface in the external test device 10 is reconfigured for synchronous communication with the control device. This takes place in program step 55. A reconfiguration of the serial interface SSO takes place correspondingly in program step 56 of the microcomputer 14, with the result that said interface is also prepared for synchronous communication with the external test device 10.

In program step 57, the external test device 10 transmits an instruction to the interface circuit 11 by means of which the reference potential for the comparators 24 to 27 of the external circuit 13 is set to 1 volt. The reference potential for the comparators 24 to 27 is thereby fixed at 1 volt for subsequent testing. If during the following test a driver stage is now switched on for the purpose of checking, the connected comparator will transmit a high potential when the voltage at the corresponding output of the control device exceeds a value of 1 volt. If, instead of this, the value is below 1 volt, the corresponding comparator will transmit a low potential. It is thus possible to check the proper switching on of the driver stages 20 to 23 by means of this functional test.

The external test device 10 transmits the test instruction "Write (0001) in REG1" to the microcomputer 14 of the control device 12 in program step 58. The result of this instruction is that the binary numerical word 0001 is entered into the output register REG1. Consequently, upon execution of this instruction, the driver stage 23 of the control device 12 is then switched on and the driver stages 20 to 22 are switched off. The transmitted test instruction of the microcomputer 14 is executed in program step 59. If the driver stage is free from defects, the output of the comparator 27 will now assume a LOW potential, and the outputs of the comparators 24 to 26 will conduct a HIGH potential. As the next test instruction, the external test device 10 transmits the instruction "Read PORT1" to the microcomputer 14 in program step 60. The result of the instruction is that the microcomputer 14 reads out the contents of the input register PORT1 and transmits it to the external test device. The instruction is executed by the microcomputer 14 in program step 61. The external test device 10 stores the received data in a memory. As the next test instruction, the external test device 10 transmits the instruction "Write (0010) in REG1" to the microcomputer 14. Owing to this instruction, the driver stage 22 is then switched on and the other driver stages are switched off. The instruction is executed by the microcomputer 14 in program step 63. The external test device 10 subsequently retransmits the instruction "READ PORT1" to the microcomputer 14 in program step 64. As in program step 61, this instruction is executed by the microcomputer 14 in program step 65. The memory contents of the input register PORT1, which have been read out, are likewise restored at a memory location in the external test device. Subsequently, the external test device 10 transmits the test instruction "WRITE (0100) in REG1" to the microcomputer 14 in program step 66. This instruction effects switching on of the output stage 21 and the switching off of all other output stages 20, 22 and 23. After this instruction has been processed by the microcomputer 14 in program step 67, the external test device 10 retransmits the instruction "READ PORT 1" to the microcomputer 14. In a fashion corresponding to program step 61, this instruction is processed by the microcomputer 14 in program step 69. The transmitted result is stored, in turn, in the memory of the external test device 10. The external test device 10 transmits the instruction "WRITE (1000) in REG1" in program step 70. The result of this instruction is thus, finally, that the driver stage 20 is switched on and the driver stages 21 to 23 are switched off. The instruction is executed by the microcomputer 14 in program step 71. In program step 72, the external test device 10 then retransmits the instruction "READ PORT1" to the microcomputer 14. Thereupon, in program step 73 the microcomputer 14 transmits the memory contents of the input register PORT1, which have been read out, to the external test device 10, which reenters the memory contents into a memory.

In program step 74, the external test device 10 transmits an instruction to the interface circuit 11, by means of which the reference potential for the comparators 24 to 27 is to be set at 11.5 volts. After the interface circuit 11 has executed this instruction, the external test device 10 then transmits the test instruction "WRITE (0000) in REG1" to the microcomputer 14 in program step 75. The instruction is executed by the microcomputer 14 in program step 76. All the driver stages 20 to 23 are thus switched off by this instruction. If the output voltage of the driver stages 20 to 23 is above 11.5 volts, a HIGH potential will be present at the outputs of the comparators 24 to 27. If, by contrast, the voltage of one of the driver stages 20 to 23 is below 11.5 volts, instead of this, that comparator will conduct a LOW potential at the output. The external test device 10 retransmits the instruction "READ PORT1" to the microcomputer 14 in program step 77. The memory contents of the input register PORT1 are retransmitted to the external test device 10 and stored there in the memory. The function test of the driver stages 20 to 23 is thus concluded.

There now follows the testing of the inputs 30 to 33 of the control device 12 to which the wheel speed sensors are connected in normal operation. The external test device 10 transmits the instruction "Start Timer" to the microcomputer 14 in program step 79. This instruction is executed by the microcomputer 14 in program step 80. The timer of the input/output circuit (EVENT PROCESSOR ARRAY) is started by this instruction. The external test device 10 transmits the test instruction "SET EPA-INPUT ON" as the next instruction. This takes place in program step 81. This instruction is executed by the microcomputer 14 in program step 82. As a result of this instruction, a trigger logic circuit of the input/output circuit which contains the special registers 16 to 19 is set in such a way that if a specific edge (rising or falling edge) is detected at the inputs 30 to 33 of the control device 12, the current counter reading of the timer is entered into the corresponding special register. In program step 83, the interface circuit 11 transmits, under the control of the external test device 10, a falling or rising edge to the inputs 30 to 33 in a time-offset fashion. The corresponding edge thus occurs at different points in time at each of the special registers 16 to 19. This means that from the start of the timer in program step 79 different times have elapsed which must then have been entered in the special registers 16 to 19. In program step 83, the external test device 10 transmits the instruction "READ EPA-TIME 1" to the microcomputer 14. The microcomputer 14 reads out the memory contents of the special register 16 and transmits said contents to the external test device 10 in program step 85. The external test device 10 correspondingly transmits the test instructions "READ EPA-TIME 2", "READ EPA-TIME 3" and "READ EPA-TIME 4" to the microcomputer 14 in program step 86, 88 and 90. The memory contents of the special registers 17 to 19 are thus then read out sequentially by the microcomputer 14 and transmitted to the external test device 10, by virtue of the execution of instructions 87, 89 and 91. In turn, the external test device 10 stores these values in a memory.

The evaluation of the stored measurement results then takes place in program step 92. For this purpose, the external test device 10 compares each individual measurement result with desired results, which are likewise stored in the memory of the test device 10. If a deviation is detected by the external test device 10, an error report to this effect can be displayed on the screen of the external test device 10 or printed out on a printer which is connected. This will then take place in program step 93. The testing is then concluded with program step 94. The voltage supply to the control device 12 can then be switched off, as a result of which the program module is then also no longer processed in the control device 12 (program step 95).

This testing concept is also designated as monitoring concept. The program module for testing represents in practice the testing tool for the test. In other words, this program module represents a monitoring program by means of which arbitrary data reading operations and data writing operations can be executed in the electronic control device to be tested. With the aid of the monitoring program, a programming language for testing control devices is made available in practice by analogy with a programming language such as BASIC in which each program instruction is interpreted individually.

A very exact function test of the control device 12 can be carried out using the test sequence described. Further components of the control device could likewise be tested in a similar way. Thus, for example, specific relays of the control device could be driven by the microcomputer 14 during the test, and the switching signals could likewise be fed back by means of the circuit 13 to inputs of the control device 12. It would also be easily possible to conduct a check of the memory contents of the EPROM. Said contents would have to be read out successively and transmitted to the external test device.

The method represented for testing electronic control devices is not restricted to the exemplary embodiment described here.

The method can also be used in the case of other control devices, in particular motor vehicle control devices such as engine control devices, gear control devices etc. For a very simple test, it would, for example, be possible to eliminate the interface circuit 11 and, instead of this, to connect the external test device directly to the control device 12 via a serial data transmission line 15. The external test device 10 also does not necessarily need to be a commercially available personal computer, but it could also be replaced by an appropriately modified diagnostic tester having a display and keyboard. As already mentioned, testing also need not take place with the control device open; instead of this, it can rather also take place with the control device closed. Specifically, control devices frequently have a diagnostic interface via which serial data transmission is likewise possible. It would therefore also be possible to make use for a test described here of this diagnostic interface, to which the external test device would then have to be connected. The data transmission between the external test device and control device can then also take place serially and asynchronously. It is likewise possible to carry out an intensified test of the control device 12 by subdividing it into a plurality of sections, a program module corresponding to this being transferred into the code RAM of the microcomputer 14. It is then thereby possible for the size of the code RAM, which would have to be provided in the microcomputer 14, to be kept small.

We claim:

1. A method for testing an electronic control device containing a microcomputer and a volatile memory for programs processed in the microcomputer, said method comprising the steps of:

a) transferring a program module for testing the control device (12) to said microcomputer (14) via a serial interface (SSO) prior to testing the control device (12), said program module including means for executing individual data reading and writing operations in said control device (12) in response to respective test commands;

b) writing the program module into the volatile memory in the control device (12) prior to the testing;

c) receiving test instructions including a plurality of said respective test commands in the microcomputer (14)

from an external test device (10) via said serial interface (SSO) connected to said external test device (10);

d) processing said program module by said microcomputer (14) to test said control device (12);

e) triggering a plurality of said individual data reading and writing operations in said control device (12) via said plurality of said respective test commands received in said control device (12);

f) transferring data generated during steps d) and e) in said control device (12) to said external test device; and g) evaluating and/or displaying said data received in said external test device in step f) with said external test device.

2. The method as defined in claim 1, wherein said data received in said external test device include measurement results.

3. The method as defined in claim 1, wherein said data received in said external test device include test results.

4. The method as defined in claim 1, further comprising providing the microcomputer (14) with registers (REG1), setting registers (REG1) of the microcomputer (14) by a writing operation of said individual data reading and writing operations in a predetermined manner so that predetermined output signals are generated at outputs (34 to 37) of the control device (12).

5. The method as defined in claim 1, further comprising providing the microcomputer (14) with memory locations and registers (PORT1, 16 to 19), reading contents of at least one of said registers (PORT1, 16 to 19) and said memory locations during a data reading operation of said individual data reading and writing operations and transmitting said contents to the external test device (10).

6. The method as defined in claim 1, further comprising integrating a serial data transmission protocol in said program module for testing of the control device (12) so that said transferring of said data from said control device to said external test device (10) takes place in accordance with said serial data transmission protocol.

7. The method as defined in claim 6, further comprising using a protocol for synchronous communication between said external test device (10) and the control device (12) as said serial data transmission protocol.

8. The method as defined in claim 1, further comprising providing an interface circuit (11) connecting the external test device (10) and the control device (12), said interface circuit (11) including means for transferring signals to inputs (30 to 33) of the control device (12), and controlling said interface circuit (11) with said external test device (10) so as to output said signals to said inputs (30 to 33) of the control device (12).

9. The method as defined in claim 1, further comprising providing an external circuit (13) including means for feeding back control device output signals to inputs (38 to 41) of the control device (12) and feeding back said output signals to said inputs of said control device with said external circuit (13).

10. The method as defined in claim 1, wherein said control device is a motor vehicle control device.

* * * * *